Aug. 12, 1958  C. S. PENNINGTON  2,847,107
ARTICLE SELECTOR FOR CONVEYOR SYSTEM
Filed May 31, 1955  4 Sheets-Sheet 1
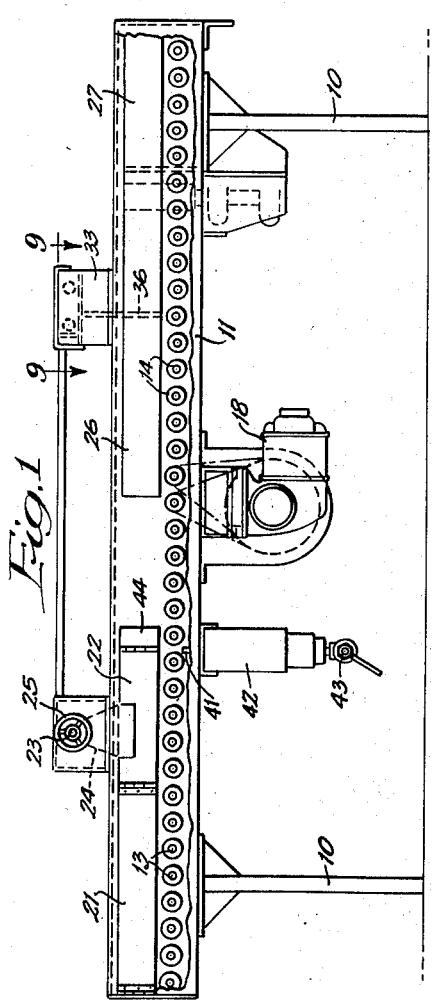
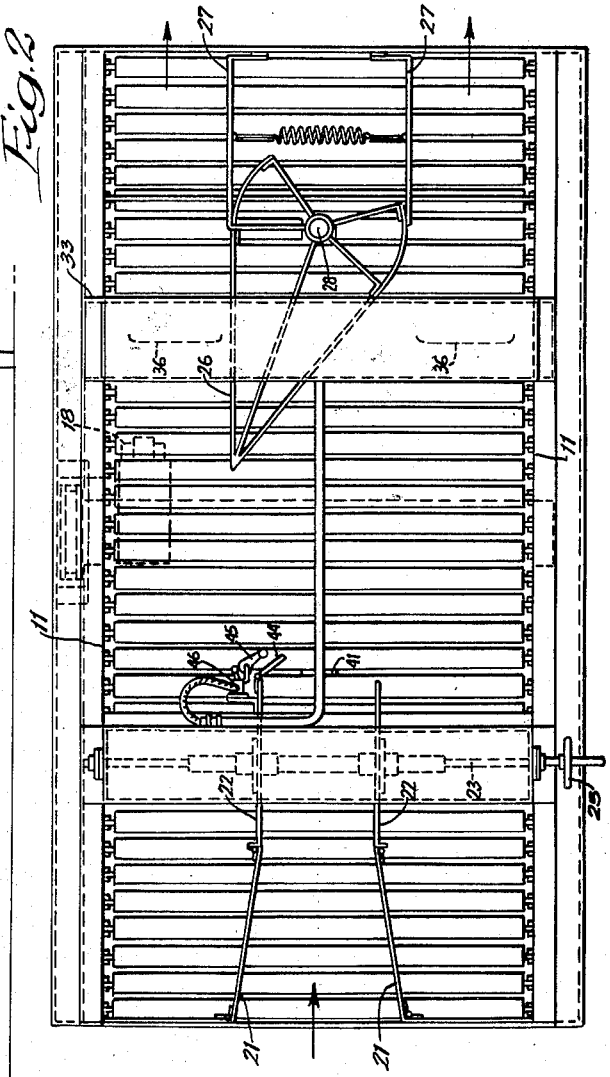
INVENTOR:
Charles S. Pennington,
BY
ATTORNEYS.

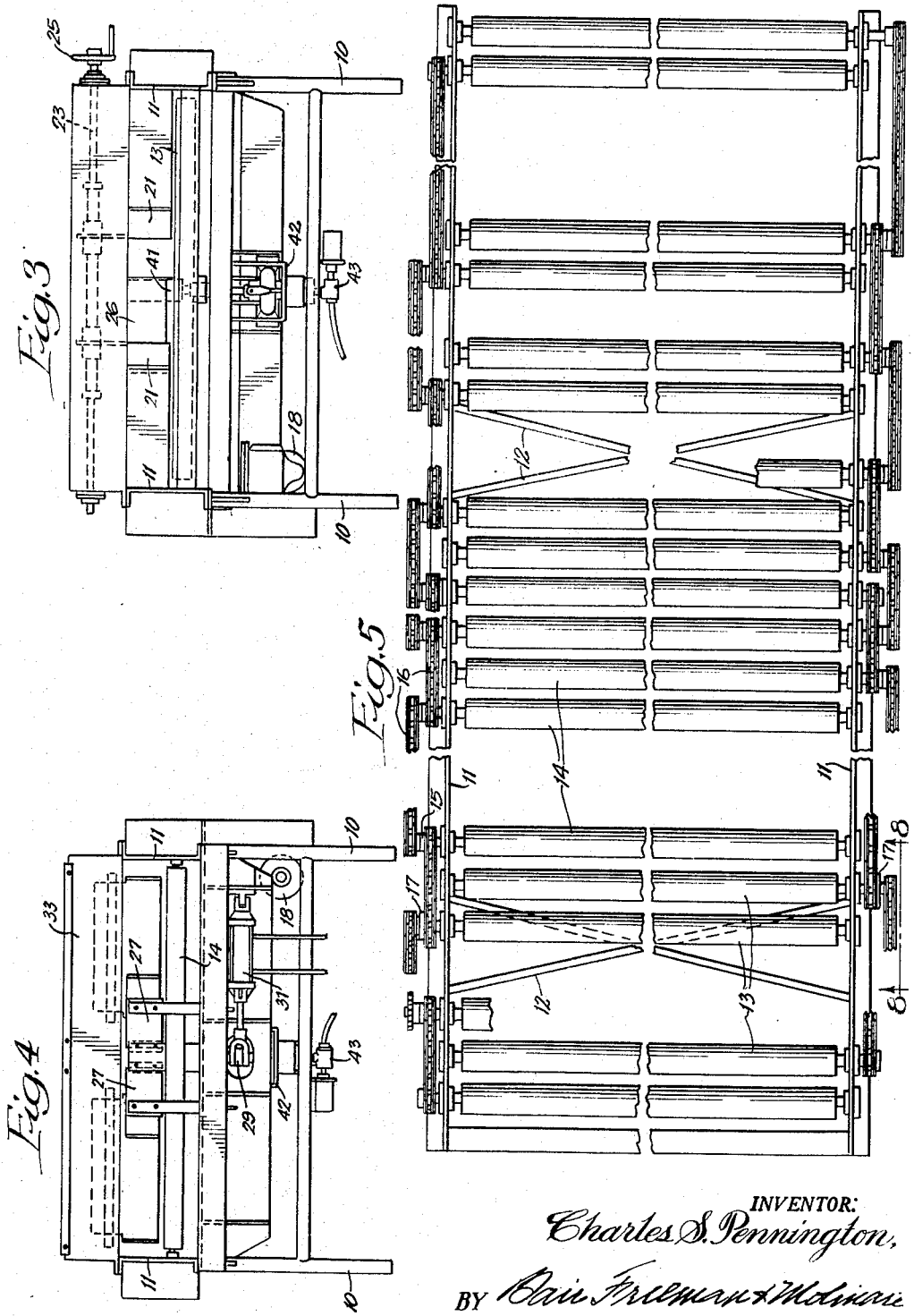

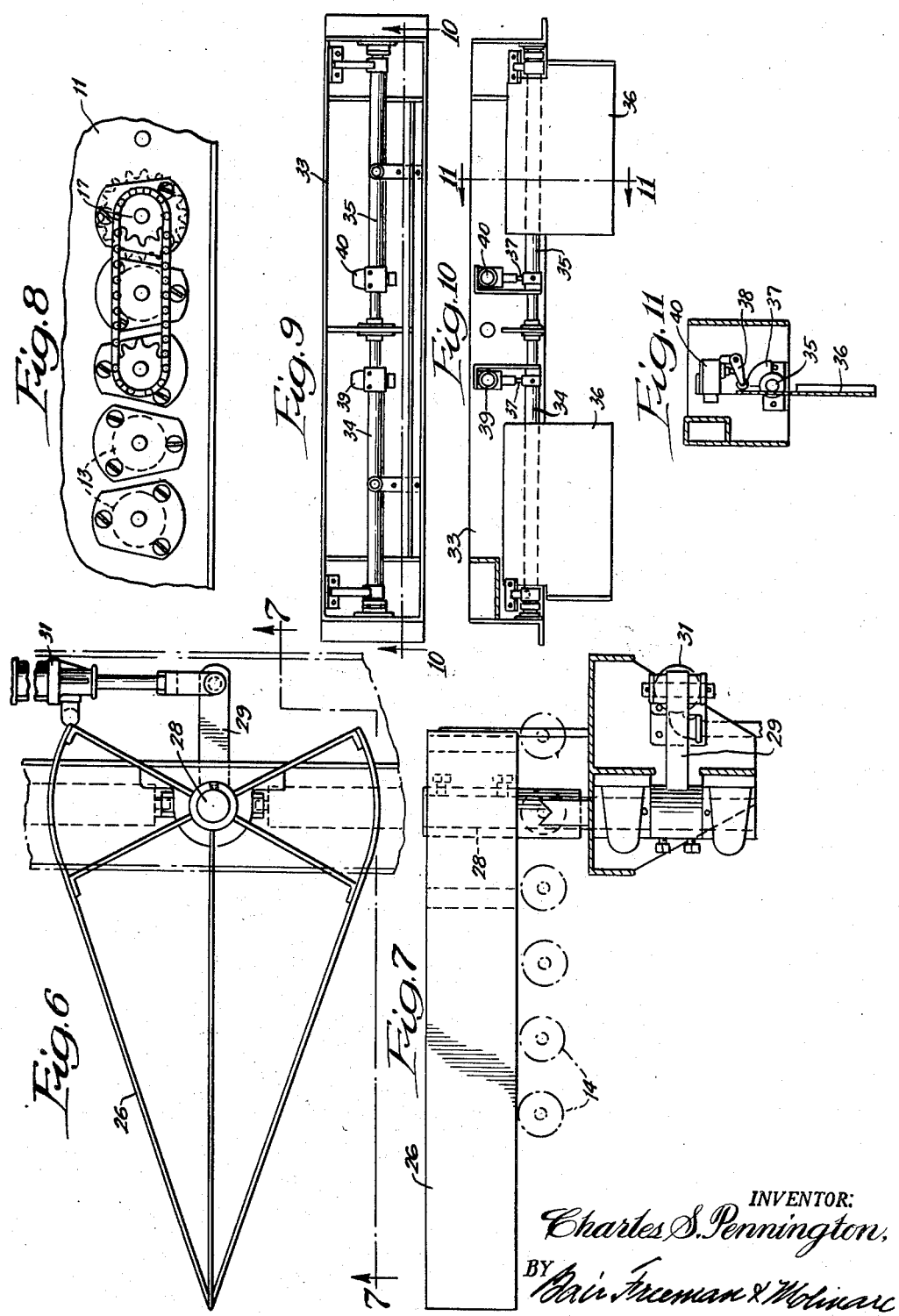

Aug. 12, 1958  C. S. PENNINGTON  2,847,107
ARTICLE SELECTOR FOR CONVEYOR SYSTEM
Filed May 31, 1955  4 Sheets-Sheet 4

INVENTOR.
Charles S. Pennington,
BY
ATTORNEYS.

United States Patent Office 2,847,107
Patented Aug. 12, 1958

2,847,107
ARTICLE SELECTOR FOR CONVEYOR SYSTEM

Charles S. Pennington, Lombard, Ill., assignor to The Petersen Oven Company, Franklin Park, Ill., a corporation of Illinois Application May 31, 1955, Serial No. 511,822

7 Claims. (Cl. 198—31)

This invention relates to article selectors for conveyor systems and more particularly to a pan selector for use in bakeries and the like.

Pan selectors have heretofore been proposed in which a diverter arm directs pans into two paths and in which control of the diverter arm is effected by control devices which sense the presence or absence of pans a substantial distance downstream from the diverter. Such mechanisms require a large amount of space and further require that a great number of pans be on the mechanism simultaneously to insure availability of pans for the subsequent operations.

Pan selectors have been proposed in which the sensing mechanisms is relatively close to the diverter arm. In such mechanisms, however, when short pans are being handled and the pans approach the diverter arm in abutting or very closely spaced relationship, the diverter arm may pass two or more pans in the same path, which is undesirable, or may strike the second pan and jam against it. When long pans are being handled, the diverter arm may strike and turn the pans causing them to be deflected into the wrong path.

It is one of the objects of the present invention to provide an article selector in which the articles, such as pans, are handled individually in a small space, each article being cleared before the next is admitted to the space.

With this arrangement, the articles can be handled in a minimum space and an adequate supply of articles can be maintained with a minimum number of articles in the apparatus.

Another object is to provide an article selector in which the articles are separated and spaced from each other by providing two conveyor sections, the second operating at a higher speed than the first.

Still another object is to provide an article selector in which a gate is provided to prevent movement of the articles to the diverter arm and controllable to block the articles by an article passing the gate and to release articles by an article entering a discharge row.

According to one feature of the invention, the gate is held in blocking position when both discharge rows are filled with articles.

According to another feature, the controls are operated by engagement of articles therewith so that they will sense both the leading and trailing ends of the articles.

A further object is to provide an article selector in which the diverter arm is controlled through pivoted fence members extending downwardly toward the conveyor to be engaged and moved by articles of any size travelling along the conveyor.

According to a feature of the invention, the fence members are mounted in a control housing spaced above the conveyor and containing the control switches and relays which constitute the control system.

The above and other objects and features of the invention will be more readily apparent from the following description when read in connection with the accompanying drawings, in which:

Figure 1 is a side elevation of an article selector embodying the invention;

Figure 2 is a top plan view;

Figure 3 is an end elevation looking from the entrance end at the left of Figures 1 and 2;

Figure 4 is an end elevation looking from the exit end;

Figure 5 is a plan view of the conveyor mechanism with parts omitted;

Figure 6 is a plan view of the diverter arm;

Figure 7 is a side elevation of the diverter arm;

Figure 8 is a partial elevation of the conveyor mechanism on the line 8—8 of Figure 5;

Figure 9 is a top plan view of the control housing with the cover omitted;

Figure 10 is a section on the line 10—10 of Figure 9;

Figure 11 is a transverse section on the line 11—11 of Figure 10;

Figure 12:
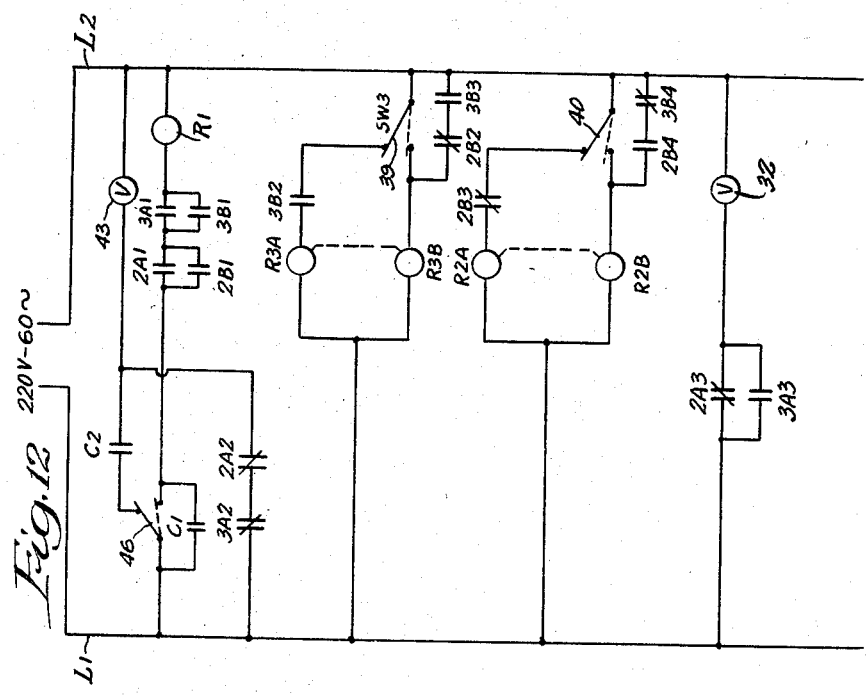
Figure 12 is a wiring diagram.

The article selector, as shown, is particularly adapted to select pans for use in bakery operations and constitutes a conveyor mechanism to receive pans in a single line or row at one end and to direct the pans outward in two lines or rows at the other end. The two discharge lines or rows can supply two separate filling mechanisms which may in turn supply two or more ovens so that it is desirable that both discharge rows or lines be supplied promptly with pans, as required.

The mechanism, as shown, comprises a main frame having legs 10 and side members 11, as best seen in Figure 5, which are rigidly connected by cross braces 12. A plurality of conveyor rollers are rotatably supported between the side members 11 and span the side members, the rollers being driven to advance articles from the entrance end of the conveyor mechanism to its exit end.

According to one feature of the present invention, the conveyor mechanism is divided into a relatively low speed entrance section and a higher speed section extending from the entrance section to the discharge end of the conveyor. As seen in Figure 5, a group of rollers 13 at the entrance end of the conveyor mechanism are adapted to be driven at relatively low speed and rollers 14 from the group of low speed rollers 13 to the discharge end of the conveyor mechanism are driven at a higher rate of speed. To accomplish this, as shown in Figures 5 and 8, each of the rollers carries at one end or the other a sprocket 15 and the sprockets are interconnected by conventional chains 16 through which the rollers are driven. Two of the rollers 13 at the discharge end of the entrance section are formed with compound sprockets 17 having small sections drivably connected through chains to the other rollers 13 and larger sections drivably connected through chains to the rollers 14. In this way, the rollers 14 are caused to turn at a higher speed than the rollers 13, the speed ratio preferably being on the order of 2:1. The rollers are driven by a motor 18 which may be connected through sprockets and chains to certain selected ones of the rollers to drive the entire group of rollers.

Articles, such as pans, are adapted to be fed onto the entrance end of the conveyor mechanism substantially centrally thereof by other conveyors or other desired types of supplying devices. To center the articles properly, thereby to insure proper selection and movement thereof, guide rails are provided at the entrance end of the conveyor mechanism. As shown, there are entrance guide rails 21 which are hinged on vertical hinges at the entrance end of the conveyor and follower rail section 22 hinged to the rails 21 and extending to the end of the entrance section. The guide rails are adapted to be adjusted to accommodate articles of different sizes and to hold the articles properly centered. For this purpose a shaft 23 extends across the frame and has at its opposite ends sections threaded with threads of opposite hand. The guide rails 22 have upwardly extending plates 24 thereon carrying internally threaded sleeves which are threaded onto the sections of opposite hand of the shaft 23 so that when the shaft is turned the guide rails 22 will be simultaneously moved together or apart. The width of the passage between the guide rails is thus accurately and easily adjusted while maintaining the guide rails symmetrically centered with respect to the conveyor mechanism. The shaft 23 may be provided with a handwheel 25 at one side of the frame for convenient operation of the shaft.

Articles entering the conveyor mechanism are adapted to be diverted into one or the other of two discharge paths by means of a diverter arm 26 pivoted on a vertical axis above the conveyor mechanism. The diverter arm, as shown, is fabricated and is open to be relatively light and tapers to a point at its forward end while being relatively wide and circularly curved at its rearward end to fit between the discharge guide rails 27. The diverter arm is supported on a vertical shaft 28 which extends upwardly above the conveyor rollers 14 and which extends below the level of the conveyor rollers. Beneath the conveyor, the shaft 28 carries an operating arm 29 projecting therefrom and pivotally connected at its outer end to the piston rod of a fluid motor 31, such as a standard air motor. The fluid motor 31 is controlled by an electrically operated four-way reversing valve illustrated diagrammatically at 32 on the wiring diagram, Figure 12. The valve 32 normally occupies a position to supply air to the lower end of the cylinder, as shown in Figure 6, so that the deflector arm will occupy its left-hand position illustrated in dotted lines in Figure 13. When the valve 32 is energized, it will move to its opposite position to admit fluid to the upper end of the cylinder 31 and swing the deflector arm to its right-hand position shown in full lines in Figure 13.

Movement of the deflector arm is controlled through a control system contained within a housing 33 mounted above and spaced from the conveyor. The housing is positioned, as shown in Figures 1 and 2, intermediate the length of the deflector arm and is spaced above the conveyor a sufficient distance so that articles to be handled, such as pans, can pass under it.

The housing 33, as best shown in Figures 9 and 10, contains two shafts 34 and 35 positioned horizontally in end-to-end alignment and freely rotatable in the housing. Each shaft carries a fence member 36 which projects downwardly to terminate close to the conveyor surface so that it will be engaged and deflected by articles passing along the conveyor. For example, when a pan enters either of the discharge paths, it will strike the fence member registering with that path to move the fence member and turn the shaft 34 or 35. It will be noted that the fence member will be initially deflected when the leading end of the pan strikes it and will remain deflected until the trailing end of the pan has passed beyond it.

The shafts 34 and 35 carry switch operating cams 37, as best seen in Figure 11, which engage the operating arms 38 of electric control switches. As shown, two control switches 39 and 40 are provided one for each of the discharge paths. When the fence members are at rest, the switches 39 and 40 will occupy the normal positions shown in the wiring diagram, Figure 12, and when either fence member is deflected by an article the corresponding switch 39 or 40 will be moved over to the dotted line position shown in Figure 12.

The housing 33 may also contain four relays R3A, R3B, R2A and R2B, as shown in the wiring diagram, Figure 12. The relays may be positioned physically in any desired position in the housing and are preferably attached to the corresponding switches 39 and 40 to form a part of the switch assemblies. Each of the relays has a plurality of contacts, as shown on the wiring diagram, Figure 12, the contacts for the respective relays being designated by 2A1, 2A2, 2B1, 2B2, 3A1, 3A2, 3B1, 3B2, etc. and being shown either as normally open or normally closed contacts, whichever position they occupy when the relay is deenergized.

As articles, such as pans, approach the deflector arm, articles passing from the low speed rollers onto the high speed rollers have their velocity increased so that the articles are separated and move individually toward the deflector arm. To insure that only one pan at a time can approach the deflector arm and to prevent passage of pans onto the conveyor when the outlet lines are full, a gate 41 is provided in the form of a relatively thin strip which can project upward between the adjacent rollers to engage articles travelling over the conveyor and block them against movement. The gate, as shown, is positioned adjacent to the discharge end of the guide rails 22 and at the line of division between the low speed rollers 13 and the high speed rollers 14. The gate is normally urged down to its article releasing position by gravity or by a spring, not shown, and is urged up to its blocking position by a fluid motor 42 supported beneath the conveyor surface on the frame. The motor 42 is supplied with operating fluid past an electrically operated valve 43 which normally is in its venting position to vent the lower end of the motor and which supplies operating fluid to the lower end of the motor when it is energized to raise the gate to its blocking position.

To assist in controlling the gate, a control lever 44 is provided pivoted on the downstream end of one of the guide plates 22 and normally projecting into the path of travel of an article travelling along the conveyor. When an article, as a pan, passes the gate it will engage the control lever 44 and swing it into substantial alignment with the guide plate on which it is pivoted. When the lever is so swung, it engages the operating arm 45 of an electric control switch 46 to move the switch 46 from the position shown in full lines in Figure 12 to the position shown in dotted lines. It will be noted that the lever remains moved until the article has completely passed the gate and that when the article has passed and releases the lever it will move back to its normal position to release the switch 46 and allow it to return to the full line position shown in Figure 12.

The control system is completed by a relay R1 operating to close the normally open contacts C1 and C2 when the relay is energized.

Figure 13:
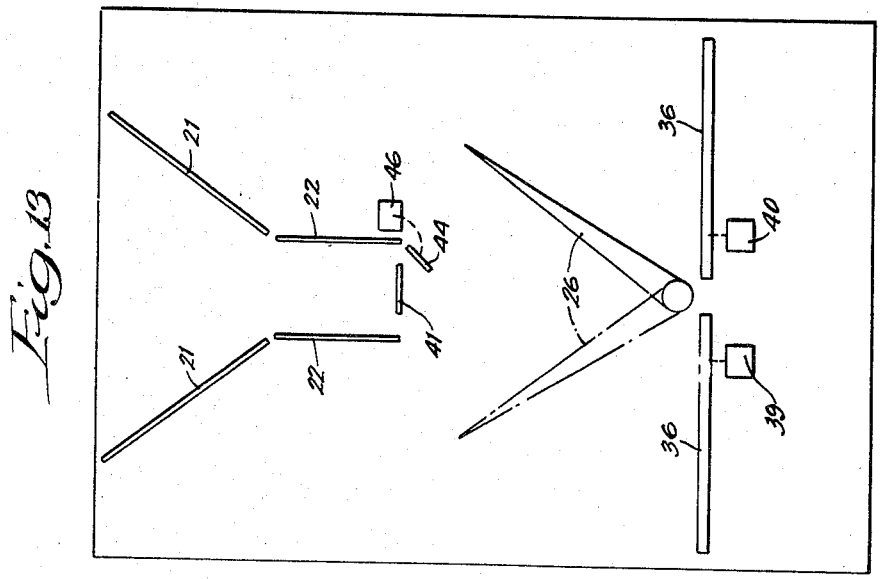
Figure 13 is a diagrammatic plan view of the mechanism to illustrate this operation.

In operation of the system, assuming that the power is off, the several relays and switches will occupy the positions indicated in the wiring diagram, Figure 12, and the deflector arm 26 will be in the dotted line position shown in Figure 13. When power is turned on to energize the system, the conveyor will start to turn, the relay R3A will be energized through the closed contact 3B2 and switch 39 and the relay R2A will be energized through the closed contact 2B3 and the switch 40. At this time, the valve 32 will be energized through the contact 3A3 which will close when the relay R3A is energized and the fluid motor 31 will operate to move the deflector arm 26 to the position shown in full lines in Figure 13 to deflect articles into the left-hand discharge path. The gate 41 remains in its down position since the circuit to the gate solenoid 43 is interrupted at the contact C2 and at the normally closed contacts 3A2 and 2A2 which will be opened when the relays R3A and R2A are energized.

When the first pan or other article enters between the guide rails 21 and 22 it will strike the control lever 44 and move the switch 46 to the dotted line position shown in Figure 12. At this time, the relay R1 will be energized through the contacts 2A1 and 3A1 which will close when the relays R2A and R3A are energized. The relay R1 will close contacts C1 and C2 completing a holding circuit to itself through the contact C1 in parallel to the switch 46. The circuit otherwise remains in its initial position as described above.

When the first pan passes the control lever 44 and releases it, the switch 46 will return to the full line position and the gate valve 43 will be energized through the switch 46 and the closed contact C2 to raise the gate to block movement of a succeeding pan. The relay R1 remains energized through the holding contact C1.

The circuit will remain in this condition until the first pan has entered the left-hand path and has struck the left-hand gate 36 to move the switch 39. As soon as the switch 39 is moved, it will interrupt the circuit to the relay R3A, deenergizing it and allowing its several contacts to return to their initial position. Opening of the contact 3A3 will deenergize the valve 32, causing the air motor 31 to move the deflector arm to the dotted line position shown in Figure 13. Opening of the contact 3A1 deenergizes the relay R1 opening its holding contact C1 and its normally open contact C2 to deenergize the gate valve 43. At this time the gate will be retracted and the second pan will enter the conveyor mechanism. When the first pan has fully deflected the gate 36 in the left-hand discharge path the switch 39 will have been moved completely to its dotted line position and will complete a circuit through the relay R3B. Energizing of this relay will close the contact 3B3 to establish a holding circuit for it parallel to the switch 39 and will also close the contact 3B1. Therefore, as soon as the second pan moves the control lever 44, the relay R1 will be energized through the contacts 2A1 and 3B1 and switch 46.

After the first pan has released the fence member 36 in the left-hand path, the switch 39 will return to its full line position, but the relay R3B will remain energized through the normally closed contact 2B2 and the holding contact 3B3. When the second pan releases the control lever 44, the switch 46 will return to its full line position to energize the gate valve 43 and raise the gate to block entry of the next pan.

The parts will remain in this condition until the second pan strikes the fence member 36 in the right-hand path and moves the switch 40 toward its dotted line position. Initial movement of the switch 40 deenergizes the relay R2A allowing the contact 2A3 to close and complete a circuit to the valve 32 to move the deflector arm to its full line position shown in Figure 13. At the same time, contact 2A1 is opened to deenergize the relay R1 and contact 2A2 closes to energize the gate valve 43 and hold the gate to its blocking position.

After the second pan has moved the switch 40 completely to its dotted line position shown in Figure 12, the relay R2B will be energized to close the contact 2B1, open the contact 2B2, open the contact 2B3 to deenergize the relay R2A and close the contact 2B4 to complete a holding circuit for the relay R2B. Opening of the contact 2B2 deenergizes the relay R3B causing the contact 3B1 to open, contact 3B2 to close thereby to energize the relay R3A, contact 3B3 to open and contact 3B4 to close. Energizing of the relay R3A opens the contact 3A2 thereby interrupting circuit to the gate valve 43 so that the gate will be released to admit the next pan. As soon as the next pan enters and deflects the control lever 44 to move the switch 46, the relay R1 will again be energized through the contacts 2B1 and 3A1. When the second pan releases the fence 36 in the right-hand discharge path, the switch 40 will return to its full line position ready for a subsequent operation, but the relay R2B will remain energized through the contacts 2B4 and 3B4. The circuit will remain in this condition until the third pan has passed and released the control lever 44 at which time the gate valve 43 will be energized through the switch 46 and contact C2 to block the next pan. As subsequent pans enter the conveyor the operation will be repeated with the deflector arm being moved each time a new pan enters to direct the pans alternately into the left and right-hand discharge paths. It will be seen that only one pan at a time is in the sensing area between the gate and the fence members 36 so that there is no possibility of jamming or of directing more than one pan at a time into either of the discharge paths. Also, since the controls are positioned relatively close together, the mechanism can be made very compact.

Assuming now that one of the paths becomes full of pans while the other path is still empty and able to accept pans. Assume, for example, that the left-hand path is full and that the last pan has just entered the left-hand path and deflected the fence member 36 therein. At this time, the deflector arm 26 will be in the dotted position, the gate solenoid 43 will be energized through switch 46 and contact C2, the relay R1 will be energized through contacts C1, 2A1 and 3B1, the relay R3B will be energized through the switch 39 and through holding contacts 2B2 and 3B3, the relay R2A will be energized through the contact 2B3 and the switch 40 and the valve 32 will be deenergized due to opening of the contact 2A3. The switch 39 will remain in its dotted line position since with the left-hand discharge line full, the last pan in the line cannot move out from under the fence member 36 to release it.

The next pan will enter the conveyor mechanism in the normal manner and will be deflected into the right-hand discharge path by the deflector arm in the usual manner, the gate being raised as soon as the pan has released the control lever 44. When the pan enters the right-hand discharge path and deflects the fence member 36 therein, the switch 40 will be moved to the dotted line position. At this time, the relay R2A will be deenergized and the relay R2B will be energized. Deenergizing of the relay R2A will open the contact 2A1 to deenergize the relay R1, but the gate valve 43 will remain energized through the contacts 3A2 and 2A2. Deenergizing of the relay R2A will cause the contact 2A3 to close and energize the valve 32 thereby causing the diverter arm to be moved to the full line position in which it would tend to deflect the next pan into the left-hand line.

As soon as the pan in the right-hand line has passed under the fence member 36 therein, the switch 40 will return to its full line position to deenergize the relay R2B since the contact 3B4 is open at this time. The relay R2A will be energized through the switch 40 and the contact 3B3 and will open the contact 2A3 to deenergize the valve 32 thereby causing the deflector arm 26 to swing back to its dotted line position. The next pan will therefore be deflected into the right-hand discharge path and the operation, as described above, will continue as long as the left-hand discharge path is full.

If the right-hand discharge path is full, the right-hand fence member 36 will remain deflected and the switch 40 will remain continuously in its dotted line position. The valve 32 will be energized through the contact 2A3 and the deflector arm will be in its full line position. Pans entering will therefore be deflected into the left-hand discharge path and will strike the left-hand fence member 36 to move the switch 39 to its dotted line position. This will deenergize the relay R3A and shortly thereafter will energize the relay R3B to deenergize the relay R1. The gate solenoid will, however, remain energized through the contacts 3A2 and 2A2 to hold the gate up in its blocking position. The relay R2A will remain deenergized as long as the switch 40 is moved by a pan in the right-hand discharge path so that all pans entering under these conditions will be deflected into the left-hand discharge path and will operate the gate to maintain the desired spacing between the pans.

If both lines become filled with pans both fence members will be deflected and both switches 39 and 40 will be held in their dotted line positions. Under these conditions the gate valve 43 will remain energized through the contacts 3A2 and 2A2 so that no further pans can be admitted until one or the other of the fence members is released. As soon as one of the fence members is released, the deflector arm will be moved to direct the pans into the corresponding discharge path in the manner described above.

With this invention, the pans are individually directed into the different discharge paths with a minimum of mechanism in a minimum amount of space. The mechanism is controlled so that the possibility of two or more pans successively entering the same path is eliminated and so that the likelihood of jamming or damage to the articles or the mechanism is minimized.

While one embodiment of the invention has been shown and described herein, it will be understood that it is illustrative only and not to be taken as a definition of the scope of the invention, reference being had for this purpose to the appended claims.

What is claimed is:

1. A pan selector comprising an elongated conveyor mechanism to move a plurality of pans in succession from the inlet end of the mechanism to the discharge end thereof, a gate near the inlet end of the conveyor mechanism movable to a blocking position to engage a pan and hold it against movement and to a release position to release the pan for movement, means for moving the gate to its blocking and release positions, and control means for the moving means positioned substantially opposite to the gate to be engaged by a pan as it is passing the gate to hold the gate in its release position and to move the gate to its blocking position when disengaged by the pan as its trailing end passes the gate to block a following pan, the conveyor mechanism including a high speed section downstream of the gate and a lower speed section upstream of the gate.

2. A pan selector comprising an elongated conveyor mechanism to move a plurality of pans in succession from the inlet end of the mechanism to the discharge end thereof, a gate near the inlet end of the conveyor mechanism movable to a blocking position to engage a pan and hold it against movement and to a release position to release the pan for movement, means for moving the gate to its blocking and release positions, guide rails adjustably positioned above the conveyor mechanism upstream of the gate and equally spaced on opposite sides of the gate and terminating at their downstream ends in alignment with the gate, means for simultaneously moving the guide rails together or apart to guide pans of different sizes in centered relation relative to the gate, and control means for the gate moving means operated by movement of a pan over the conveyor mechanism and including a switch carried by one of the guide rails at the downstream end thereof to be operated by a pan passing the guide rails.

3. The construction of claim 2 in which the conveyor mechanism includes a high speed section downstream of the gate and a lower speed section upstream of the gate.

4. A pan selector comprising an elongated conveyor mechanism to move a plurality of pans in succession from the inlet end of the mechanism to the outlet end thereof, means to deliver pans to the inlet end of the conveyor mechanism centrally of its width, the pans being discharged from the outlet end of the mechanism in two rows, a deflector arm above the conveyor mechanism movable from one side to the other to direct pans alternately into the two parallel rows, means to move the deflector arm, a gate spaced upstream from the deflector arm movable to a blocking position to prevent movement of pans to the deflector arm and a release position to pass pans, means to move the gate, guide rails adjustably mounted up stream of the gate and laterally adjustable to guide pans of different sizes to the gate and terminating at their downstream ends in alignment with the gate, a control lever on the downstream end of one of the guide rails to be engaged and operated by a pan passing the gate, a pair of shiftable control elements mounted above the two parallel rows respectively to be engaged and operated by pans entering the rows, and a control system including the control lever and control elements for controlling the gate moving means and the deflector arm moving means to move the gate to blocking position after a pan has passed the gate, move the gate to release position after the pan has entered one of the rows, and move the deflector arm to divert pans to the other row when a pan has entered one of the rows.

5. A pan selector comprising an elongated conveyor mechanism to move a plurality of pans in succession from the inlet end of the mechanism to the outlet end thereof, means to deliver pans to the inlet end of the conveyor mechanism centrally of its width, the pans being discharged from the outlet end of the mechanism in two rows, a deflector arm above the conveyor mechanism movable from one side to the other to direct pans alternately into the two parallel rows, means to move the deflector arm, a gate spaced upstream from the deflector arm movable to a blocking position to prevent movement of pans to the deflector arm and a release position to pass pans, means to move the gate, guide rails adjustably mounted upstream of the gate and laterally adjustable to guide pans of different sizes to the gate and terminating at their downstream ends in alignment with the gate, a control lever on the downstream end of one of the guide rails to be engaged and operated by a pan passing the gate, a pair of shiftable control elements mounted above the two parallel rows respectively to be engaged and operated by pans entering the rows, electrical control devices for the gate moving means and the deflector arm moving means, and a control circuit including the electrical control devices and switches operated by the control lever and the control elements to move the gate to blocking position when the control lever is released by a pan, move the gate to release position when either one of the control elements is engaged by a pan, and move the deflector arm to direct pans into the other row when the control element above one of the rows is engaged by a pan.

6. The construction of claim 5 in which the control circuit includes relays to hold the gate in blocking position when both of the control elements are engaged by a pan.

7. A pan selector comprising an elongated conveyor mechanism to move a plurality of pans in succession from the inlet end of the mechanism to the discharge end thereof, a gate near the inlet end of the conveyor mechanism movable to a blocking position to engage a pan and hold it against movement and to a release position to release the pan for movement, a first motor to move the gate to blocking position, a first control switch adjacent the gate to be engaged and moved by a pan passing the gate, a deflector arm downstream from the gate to deflect pans alternately into two different rows, a second motor to move the deflector arm, second control switches in the paths downstream from the deflector arm to be engaged and moved by pans moving along the paths, a relay, a control circuit for the relay including the first and second switches, control means for the first motor controlled by the relay and including the first switch, the first switch when moved by a pan energizing the relay and when released by a pan cooperating with the control means to move the gate to blocking position, the second switches when intially moved by a pan de-energizing the relay to move the gate to its release position and controlling the second motor to move the deflector arm and when fully moved by a pan conditioning the control circuit for energizing of the relay by the first switch.

References Cited in the file of this patent

UNITED STATES PATENTS

| | | |
|---|---|---|
| 635,177 | McCabe | Oct. 17, 1899 |
| 1,160,791 | Houten | Nov. 16, 1915 |
| 1,779,866 | Willcox | Oct. 28, 1930 |
| 1,824,754 | Bock | Sept. 22, 1931 |
| 1,912,898 | Jennings | June 6, 1933 |
| 1,961,661 | Fuller | June 5, 1934 |
| 2,371,926 | Schmitt | Mar. 20, 1945 |
| 2,627,334 | Koppel | Feb. 3, 1953 |
| 2,670,835 | Huttmann | Mar. 2, 1954 |